US009677897B2

(12) United States Patent
Driscoll et al.

(10) Patent No.: US 9,677,897 B2
(45) Date of Patent: Jun. 13, 2017

(54) DEAD RECKONING SYSTEM FOR VEHICLES

(71) Applicant: Elwha LLC, Bellevue, WA (US)

(72) Inventors: Tom Driscoll, San Diego, CA (US); Joseph R. Guerci, Arlington, VA (US); Russell J. Hannigan, Sammamish, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); David R. Smith, Durham, NC (US); Clarence T. Tegreene, Mercer Island, WA (US); Yaroslav A. Urzhumov, Bellevue, WA (US); Charles Whitmer, North Bend, WA (US); Lowell L. Wood, Jr., Bellevue, WA (US); Victoria Y. H. Wood, Livermore, CA (US)

(73) Assignee: Elwha LLC

( * ) Notice: Subject to any disclaimer, the term of this patent is extended or adjusted under 35 U.S.C. 154(b) by 960 days.

(21) Appl. No.: 14/078,881

(22) Filed: Nov. 13, 2013

(65) Prior Publication Data

US 2016/0223354 A1    Aug. 4, 2016

(51) Int. Cl.
   *G06T 7/00*    (2006.01)
   *G01C 21/36*    (2006.01)
   (Continued)

(52) U.S. Cl.
   CPC ........ *G01C 21/3602* (2013.01); *G06T 7/0026* (2013.01); *G06T 7/0028* (2013.01);
   (Continued)

(58) Field of Classification Search
   None
   See application file for complete search history.

(56) References Cited

U.S. PATENT DOCUMENTS

| 5,020,903 A | 6/1991 | Sakai et al. |
| 6,412,183 B1 | 7/2002 | Uno |

(Continued)

OTHER PUBLICATIONS

PCT International Search Report; International App. No. PCT/US2014/064955; May 8, 2015; pp. 1-3.
(Continued)

*Primary Examiner* — Thomas Tarcza
*Assistant Examiner* — Garrett Evans

(57) ABSTRACT

Described embodiments include a system and method. A system includes a first and second digital imaging devices. Each digital imaging device is configured to capture digital images of a surface traveled by a vehicle. A digital image correlator is configured to (i) correlate a first digital image of the surface captured by a first digital imaging device at a first time and a second digital image of the surface captured by a second digital imaging device at a subsequent second time, and (ii) determine a correlation vector. The first and second imaging devices are separated by a known distance. A kinematics circuit is configured to determine in response to the correlation vector an incremental translation and rotation of the vehicle. The system includes a navigation circuit configured to combine at least two instances of the incremental translation and rotation into data indicative of travel by the vehicle.

41 Claims, 8 Drawing Sheets

(51) Int. Cl.
*H04N 5/247* (2006.01)
*H04N 5/33* (2006.01)
*H04N 5/225* (2006.01)

(52) U.S. Cl.
CPC .......... *H04N 5/2256* (2013.01); *H04N 5/247* (2013.01); *H04N 5/332* (2013.01); *G06T 2207/30252* (2013.01)

(56) References Cited

U.S. PATENT DOCUMENTS

| 8,064,047 | B2 | 11/2011 | Puellen et al. |
| 2001/0004168 | A1 | 6/2001 | Onogi |
| 2004/0022432 | A1 | 2/2004 | Hayata et al. |
| 2004/0091133 | A1 | 5/2004 | Monji |
| 2009/0016073 | A1 | 1/2009 | Higgins-Luthman et al. |
| 2009/0284597 | A1 | 11/2009 | Nakamori et al. |
| 2010/0121561 | A1 | 5/2010 | Kodaira et al. |
| 2010/0259609 | A1 | 10/2010 | Takahashi |
| 2010/0284569 | A1 | 11/2010 | Sakurai |
| 2011/0007163 | A1 | 1/2011 | Sakurai |
| 2012/0022761 | A1 | 1/2012 | Matsuda |
| 2012/0070088 | A1 | 3/2012 | Yoshimi |
| 2012/0167687 | A1 | 7/2012 | Wakao |
| 2013/0162829 | A1 | 6/2013 | Kadowaki et al. |
| 2013/0294643 | A1 | 11/2013 | Fan et al. |

OTHER PUBLICATIONS

Kucera et al.; "Using Particle Image Velocimetry for Road Vehicle Tracking and Performance Monitoring"; Apr. 13, 2011; Paper #2011-01-0279; The University of Tulsa; SAE International; SAE World Congress; Detroit, MI.

"Optical Mouse"; Wikipedia, the free encyclopedia; printed on Sep. 23, 2013; pp. 1-6; http://en.wikipedia.org/wiki/Optical_mouse.

"Particle Image Velocimetry (PIV)"; La Vision; printed on Sep. 23, 2013; pp. 1-2; http://www.lavision.de/en/techniques/piv/php.

PCT International Search Report; International App. No. PCT/US2014/064952; bearing a date of Apr. 28, 2015; pp. 1-3.

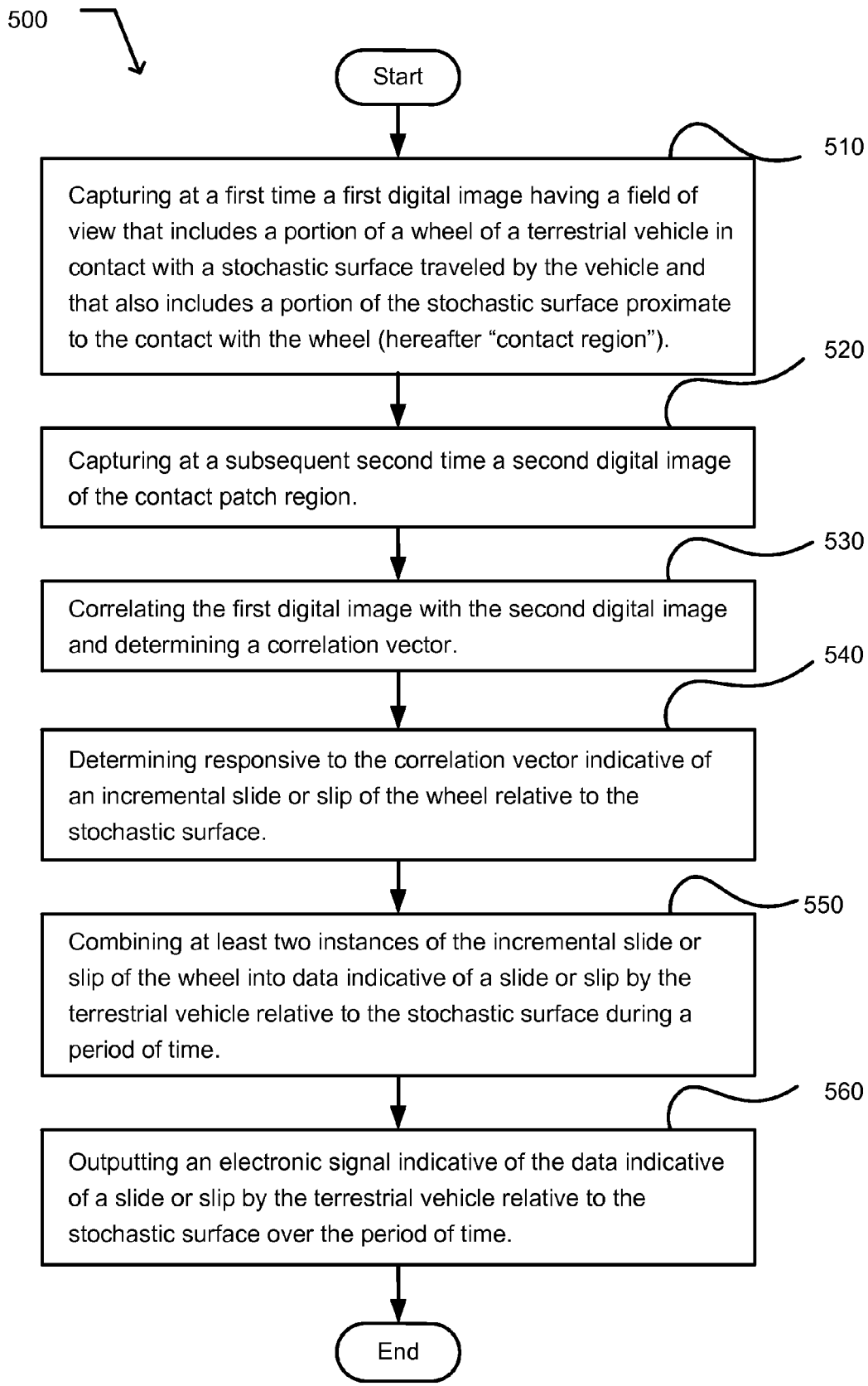

FIG. 8

610 Means for capturing (i) at a first time a first digital image having a field of view that includes a portion of a wheel of a terrestrial vehicle in contact with a stochastic surface traveled by the vehicle and that also includes a portion of the stochastic surface proximate to the contact with the wheel (hereafter "contact region"), and (ii) at a subsequent second time a second digital image of the contact region.

620 Means for correlating the first digital image with the second digital image and determining a correlation vector.

630 Means for determining responsive to the correlation vector an incremental slide or slip of the wheel relative to the stochastic surface.

640 Means for combining at least two instances of an incremental slide or slip by the wheel into data indicative of a slide or slip by the terrestrial vehicle relative to the stochastic surface during a period of time.

650 Means for outputting an electronic signal indicative of the data indicative of a slide or slip by the terrestrial vehicle relative to the stochastic surface over the period of time.

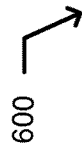
600

DEAD RECKONING SYSTEM FOR VEHICLES

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None.

RELATED APPLICATIONS

U.S. patent application Ser. No. 14/078,904, entitled WHEEL SLIP OR SPIN NOTIFICATION, naming Tom Driscoll, Joseph R. Guerci, Russell J. Hannigan, Roderick A. Hyde, Muriel Y. Ishikawa, Jordin T. Kare, Nathan P. Myhrvold, David R. Smith, Clarence T. Tegreene, Yaroslav A. Urzhumov, Charles Whitmer, Lowell L. Wood, Jr., and Victoria Y. H. Wood as inventors, filed Nov. 13, 2013 is related to the present application.

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

SUMMARY

For example, and without limitation, an embodiment of the subject matter described herein includes a system. The system includes a first digital imaging device and a second digital imaging device. Each digital imaging device is configured to capture multiple pixel two-dimensional digital images of a stochastic surface traveled by a vehicle. The system includes a digital image correlator configured to (i) correlate a first digital image of the stochastic surface captured by the first digital imaging device at a first time and a second digital image of the stochastic surface captured by the second digital imaging device at a subsequent second time, and (ii) determine a correlation vector. The first digital image acquired by the first digital imaging device and the second digital image acquired by the second imaging device while carried by the vehicle and separated by a known distance relative to a longitudinal axis of the vehicle. The system includes a kinematics circuit configured to determine in response to the correlation vector an incremental translation and rotation of the vehicle between the first time and the second time. The system includes a navigation circuit configured to combine at least two instances of the incremental translation and rotation of the vehicle into data indicative of an acceleration, speed, distance, direction, or course traveled by the vehicle during a period of time.

In an embodiment, the system includes a display device configured to display a human perceivable presentation of the data descriptive of the acceleration, speed, distance, direction, or course traveled by the vehicle over the period of time. In an embodiment, the system includes the vehicle. In an embodiment, the system includes a communication circuit configured to output an electronic signal indicative of the acceleration, speed, distance, direction, or course traveled by the vehicle over the period of time. In an embodiment, the communication circuit is further configured to output a signal indicative of a course traveled by the vehicle over the period of time with reference to a previous known good position received from a satellite based navigation system, an internal navigation system of the vehicle, or user entered location. In an embodiment, the system includes an illumination device configured to illuminate at least a portion of the stochastic surface during a capture of the first digital image or the second digital image.

For example, and without limitation, an embodiment of the subject matter described herein includes a method. The method includes capturing at a first time a first digital image of a stochastic surface being traveled by a vehicle. The method includes capturing at a second time subsequent to the first time a second digital image of the stochastic surface being traveled. The second image is captured by a second image capture device separated by a known distance relative to a longitudinal axis of the vehicle from a first image device that captured the first digital image. The method includes correlating the first digital image and the second digital image, and determining a correlation vector. The method includes determining responsive to the correlation vector an incremental translation and rotation of the vehicle between the first time and the second time. The method includes combining at least two instances of the incremental translation and rotation of the vehicle into data indicative of an acceleration, speed, distance, direction, or course traveled by the vehicle during a period of time.

In an embodiment, the method includes transforming the data into a particular human-perceivable depiction of the acceleration, speed, distance, direction, or course traveled by the vehicle during a period of time. In an embodiment, the method includes transforming the data indicative of an acceleration, speed, distance, direction, or course into data usable in displaying a particular visual depiction of the acceleration, speed, distance, direction, or course traveled by the vehicle during a period of time. In an embodiment, the method includes outputting an electronic signal usable in displaying a particular visual depiction of the acceleration, speed, distance, direction, or course traveled by the vehicle during a period of time. In an embodiment, the method includes illuminating at least a portion of the stochastic surface during a capture of the first digital image or the second digital image.

For example, and without limitation, an embodiment of the subject matter described herein includes a system. The system includes means for capturing at a first time a first digital image of a stochastic surface being traveled by a vehicle. The system includes means for capturing at a second time subsequent to the first time a second digital image of the stochastic surface being traveled. The means for capturing the second image separated by a known distance relative to a longitudinal axis of the vehicle from the means for capturing the first digital image. The system includes means for correlating the first digital image and the second digital image, and a determining a correlation vector. The system includes means for determining responsive to the correlation vector an incremental translation and rotation of the vehicle between the first time and the second time. The system includes means for combining at least two instances of the of the incremental translation and rotation of the vehicle into data indicative of an acceleration, speed, distance, direction, or course traveled by the vehicle during a period of time. In an embodiment, the system further includes means for transforming the data into a particular human-perceivable depiction of the acceleration, speed, distance, direction, or course traveled by the vehicle during a period of time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 illustrates an example operational flow; and

FIG. 8 illustrates an example system.

DETAILED DESCRIPTION

Figure 1:
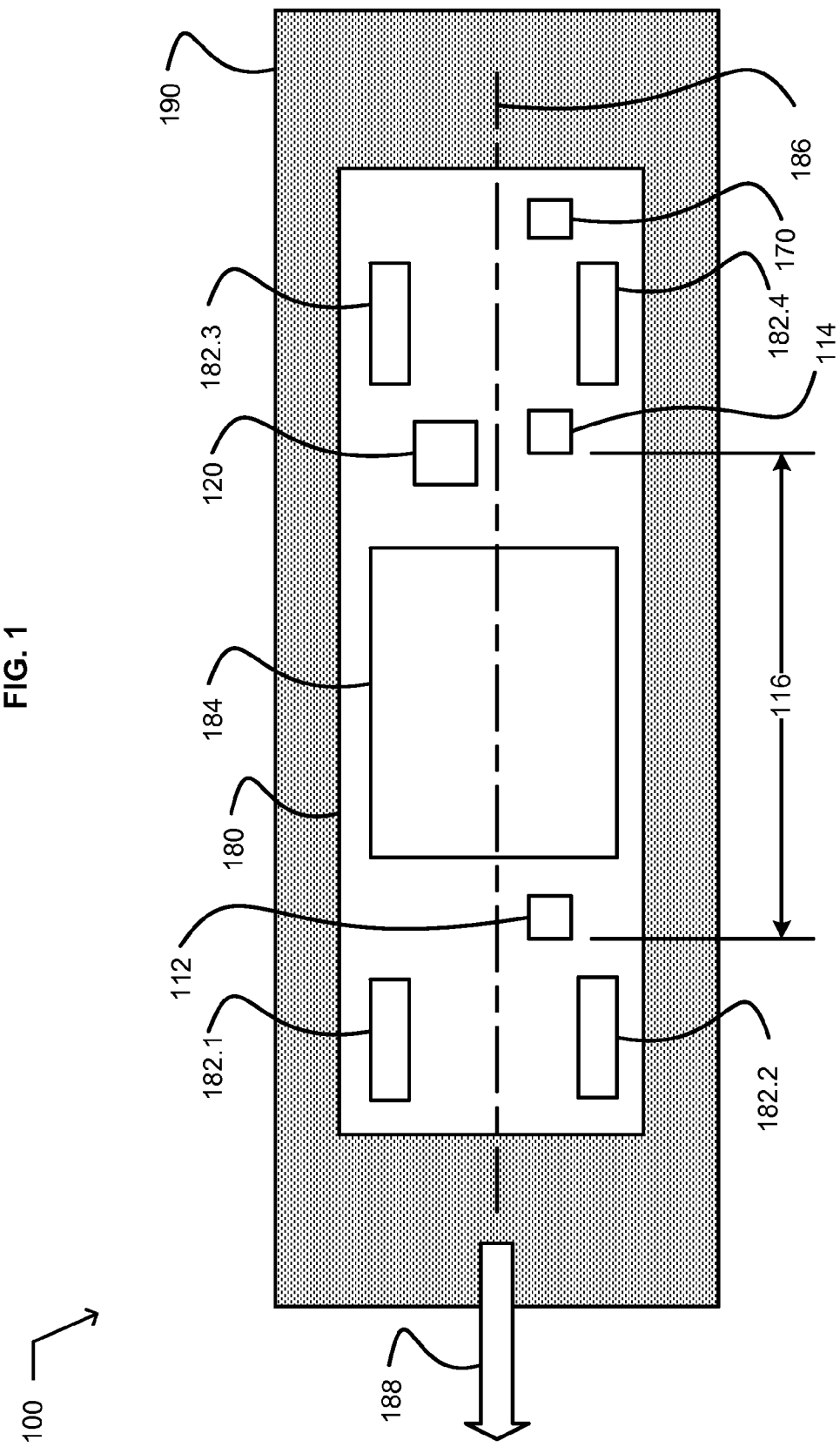
FIG. 1 schematically illustrates an example environment in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Those having skill in the art will recognize that the state of the art has progressed to the point where there is little distinction left between hardware, software, and/or firmware implementations of aspects of systems. The use of hardware, software, and/or firmware is generally (but not always, in that in certain contexts the choice between hardware and software can become significant) a design choice representing cost vs. efficiency tradeoffs. Those having skill in the art will appreciate that there are various implementations by which processes and/or systems and/or other technologies described herein can be effected (e.g., hardware, software, and/or firmware), and that the preferred implementation will vary with the context in which the processes and/or systems and/or other technologies are deployed. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Hence, there are several possible implementations by which the processes and/or devices and/or other technologies described herein may be effected, none of which is inherently superior to the other in that any implementation to be utilized is a choice dependent upon the context in which the implementation will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to implement an operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components.

Alternatively or additionally, implementations may include executing a special-purpose instruction sequence or otherwise invoking circuitry for enabling, triggering, coordinating, requesting, or otherwise causing one or more occurrences of any functional operations described below. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof and a wide range of components that may impart mechanical force or motion such as rigid bodies, spring or torsional bodies, hydraulics, electro-magnetically actuated devices, and/or virtually any combination thereof Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, module, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will also recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will further recognize that at least a portion of the devices and/or processes described herein can be integrated into an image processing system. A typical image processing system may generally include one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch-sensitive screen or display surface, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will likewise recognize that at least some of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch-sensitive screen or display surface, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

A system, apparatus, or device may include a variety of computer-readable media products. Computer-readable media may include any media that can be accessed by the computing device and include both volatile and nonvolatile media, removable and non-removable media. By way of example, and not of limitation, computer-readable media may include computer storage media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by a computing device. In a further embodiment, a computer storage media may include a group of computer storage media devices. In another embodiment, a computer storage media may include an information store. In another embodiment, an information store may include a quantum memory, a photonic quantum memory, or atomic quantum memory. Combinations of any of the above may also be included within the scope of computer-readable media.

A computer storage media may include volatile and nonvolatile memory, such as ROM and RAM. A RAM may include at least one of a DRAM, an EDO DRAM, a SDRAM, a RDRAM, a VRAM, or a DDR DRAM. A computer storage media may also include other removable/non-removable, volatile/nonvolatile computer storage media products, such as a non-removable non-volatile memory interface (hard disk interface) that reads from and writes for example to non-removable, non-volatile magnetic media. A computer storage media may include a magnetic disk, such as a removable, non-volatile magnetic disk, or a removable, non-volatile optical disk, such as a CD ROM. Other removable/non-removable, volatile/non-volatile computer storage media that can be used in the example operating environment include, but are not limited to, magnetic tape cassettes, memory cards, flash memory cards, DVDs, digital video tape, solid state RAM, and solid state ROM.

FIG. 1 schematically illustrates an example environment 100 in which embodiments may be implemented. The environment includes a vehicle 180 traveling in a direction 188 across a stochastic surface 190, such as a paved road having an aggregate surface or other surface defining a stochastic surface. In an embodiment, the vehicle includes front wheels 182.1 and 182.2, rear wheels 182.3 and 182.4, and a passenger compartment 184.

A system 120 includes a first digital imaging device 112 and a second digital imaging device 114. Each digital imaging device is configured to capture multiple pixel two-dimensional digital images of the stochastic surface traveled by the vehicle. In an embodiment, a digital image is a two-dimensional function f(x,y), where x and y are the spatial (plane) coordinates, and the amplitude at any pair of coordinates (x,y) is called the intensity of the image at that level. In an embodiment, a digital image includes an image where x, y, and the amplitude values of f are finite and discrete quantities. In an embodiment, a digital image is composed of a finite number of elements called pixels, each of which has a particular location and value.

Figure 2:
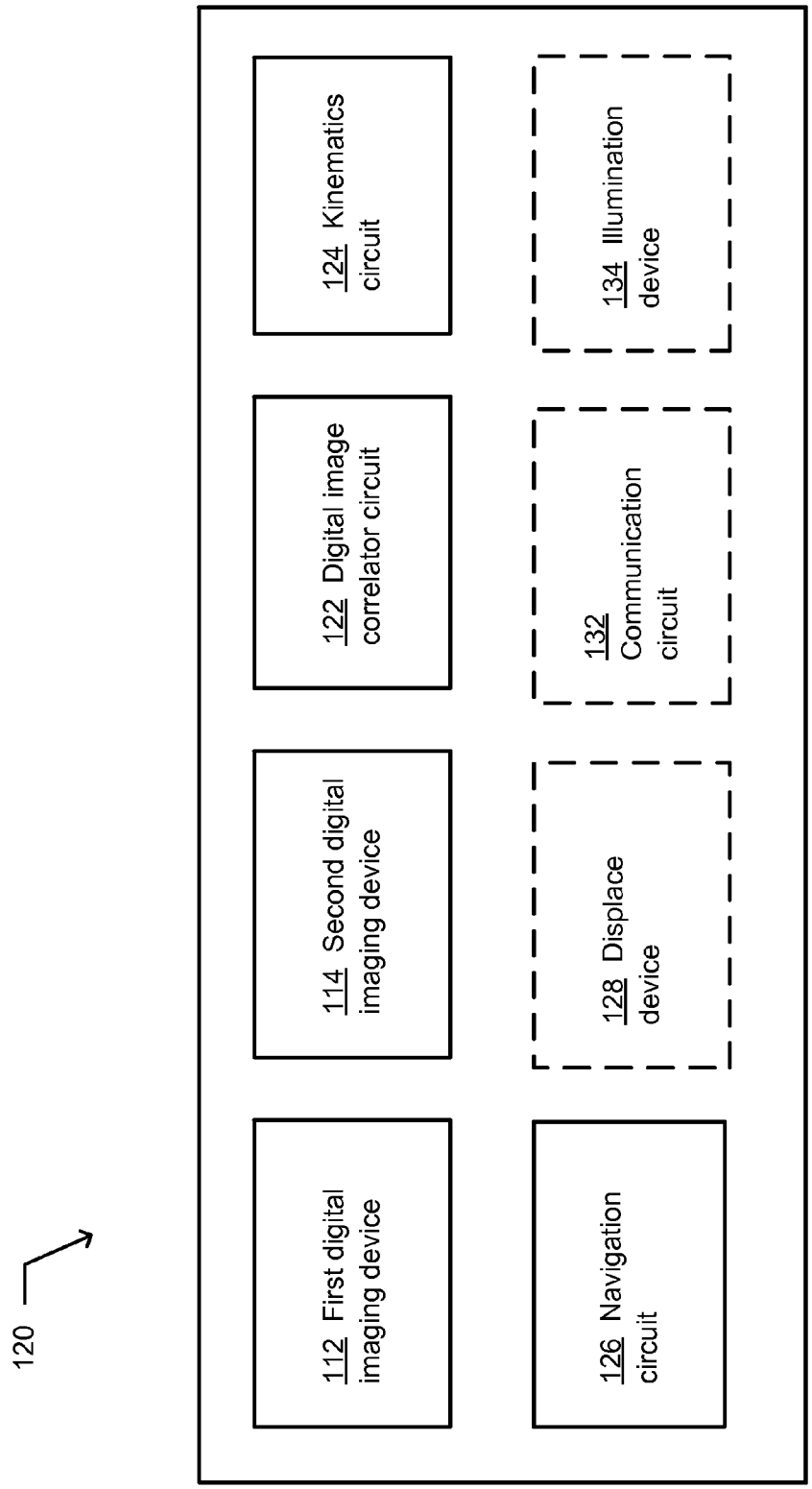
FIG. 2 illustrates additional elements of the system of FIG. 1.

FIG. 2 illustrates additional elements of the system 120 of FIG. 1. The system includes a digital image correlator circuit 122 configured to (i) correlate a first digital image of the stochastic surface 190 captured by the first digital imaging device 112 at a first time and a second digital image of the stochastic surface captured by the second digital imaging device 114 at a subsequent second time, and (ii) determine a correlation vector. For example, a second subsequent time may be about one-fifth, one-tenth, or one-twentieth of a second after the first time. The time difference between the first and second times is a function of vehicle speed and the separation distance 116. In an embodiment, both the first and second digital imaging devices acquire continuous streams of digital images with a time track that spans the first time and the subsequent second time. For example, in such embodiment, digital images in the stream acquired by the first digital imaging device are correlated with digital images in the stream acquired by the second digital imaging device. In an embodiment, the second digital imaging device may acquire a continuous stream of digital images over a time interval that begins at approximately the same time as the first digital image is captured. The second digital image may be selected by the digital image correlator circuit or another circuit from the continuous stream of images based upon a possible correlation level with the first digital image, and the remaining images in the continuous stream discarded, or used in another round of selecting a second digital image for correlating with another first digital image. In an embodiment, acquisition of a series of digital images may be timed based upon an approximate speed of the vehicle and the known distance 116. For example, the approximate speed may be estimated based upon a value obtained from a speedometer of the vehicle. For example, the correlation of the images of the stochastic surface may be implemented at least in part using digital image correlation techniques known to those having skill in the art. For example, in an embodiment, digital particle image velocimetry techniques may be employed. In addition, the correlation of the images may involve one or more additional preprocessing circuits known to those having skill in the art and selected at least in part based on requirements of the correlator and speed of the vehicle. In an embodiment, the digital image correlator circuit may be implemented using an image array processing program, circuit, or application known to person having skill in the art. For example, MatLab® includes a digital image correlation process. For example, Mathematica® includes a digital image correlation process. In an embodiment, the digital image correlator is configured to correlate the first image and the second image using a feature correlation or an edge detection methodology. For example, an edge detection methodology may include a methodology that detects cracks in the stochastic surface, such as a crack in a road. In an embodiment, the digital image correlator circuit may be implemented using any methodology that figures out how the first and second images are lined up with each other. In an embodiment, the first digital imaging device and the second imaging device are both carried by the vehicle and separated by a known distance 116 relative to a longitudinal axis 186 of the vehicle 180. A kinematics circuit 124 is configured to determine in response to the correlation vector an incremental translation and rotation of the vehicle between the first time and the second time. A navigation circuit 126 is configured to combine at least two instances of the incremental translation and rotation of the vehicle into data indicative of an acceleration, speed, distance, direction, or course traveled by the vehicle during a period of time. For example, in an embodiment, the navigation circuit may provide a relatively continuously updated data of the position of the vehicle as it travels along a road having the stochastic surface 190 during a period of time. The navigation circuit updates the vehicle position by adding the incremental translation and rotation of the vehicle determined during the period of time. In an embodiment, the navigation circuit is further configured to generate interpolated incremental translation and rotation to fill in any gaps in the determined incremental translation and rotation during the period of time.

In an embodiment, the vehicle 180 includes a terrestrial vehicle. For example, a terrestrial vehicle may include a car, a truck, a train, or a robot. In an embodiment, the vehicle includes an aircraft or watercraft. For example, a watercraft may include a ship, submarine, or unmanned underwater vehicle, and the digital image of the stochastic surface 190 may include a sonar image of a seabed or underwater surface. In an embodiment, the stochastic surface includes a road surface. In an embodiment, the stochastic surface includes a seabed surface. In an embodiment, the stochastic surface includes a water surface. For example, a transitory wave pattern is expected to have sufficient duration for a short-term correlation. For example, a low flying UAV may use the system 120 to navigate over a water surface. In an embodiment, the stochastic surface includes a portion of the surface of the earth, such as by aerial topography. In an embodiment, the stochastic surface includes a surface of a roadbed for a train or other rail carried vehicle. In an embodiment, the stochastic surface includes an underground stochastic surface. For example, the roadbed may include an underground surface, such as in a train or vehicular tunnel, or such as in a mine or other subsurface operation.

In an embodiment, the first digital imaging device 112 includes a first high resolution digital imaging device and the second digital imaging device 114 includes a second relatively lower resolution imaging device. In an embodiment, the first digital imaging device includes a first low resolution digital imaging device and the second digital imaging device includes a second relatively higher resolution imaging device. In an embodiment, one digital imaging device includes a wide field of view and the other digital imaging device includes a relatively narrower field of view. In an embodiment, at least one of the digital imaging devices has a resolution greater than 100 pixels by 100 pixels. In an embodiment, at least one of the digital imaging devices is configured to capture visible light digital images of the stochastic surface. In an embodiment, at least one of the digital imaging devices is configured to capture infrared light digital images or ultraviolet light digital images of the stochastic surface. In an embodiment, at least one of the digital imaging devices is configured to capture ultrasound images of the stochastic surface. In an embodiment, at least one of the digital imaging devices is configured to capture sonar digital images of the stochastic surface. In an embodiment, at least one of the digital imaging devices is configured to capture color, spectral, multispectral, or hyperspectral digital images of the stochastic surface. In an embodiment, at least one of the digital imaging devices is configured to capture millimeter-wave or terahertz wave digital images of the stochastic surface.

In an embodiment, the digital image correlator circuit 122 is configured to account for a z-axis motion or a tilt of the vehicle 180 relative to the stochastic surface 190. In an embodiment, the first digital imaging device 112 is carried by the vehicle 180 on a forward portion of the vehicle and the second digital imaging device 114 is carried by the vehicle on a rearward portion of the vehicle. Forward and rearward are determined given a customary direction of travel by the vehicle in a straight-ahead direction of travel 188. In an embodiment, a forward portion is forward of a midpoint of the longitudinal axis 186 of the vehicle, and a rearward potion is behind the midpoint of the longitudinal axis of the vehicle. In an embodiment, the first digital imaging device is carried by the vehicle in a portion of a forward one-third of the vehicle and the second digital imaging device is carried by the vehicle in a portion of a rearward one-third of the vehicle as measured along the longitudinal axis of the vehicle. In an embodiment, the known separation distance 116 is at least five feet.

In an embodiment, the determined incremental translation and rotation is responsive to the known separation distance 116. In an embodiment, the kinematics circuit 124 is configured to determine responsive to the correlation and the known separation distance 116 an incremental translation and rotation of the vehicle 180 between the first time and the second time. In an embodiment, the kinematics circuit is further configured to determine an incremental slip or skid of a wheel of the vehicle in response to the incremental translation and rotation and in response to data received from a wheel speed sensor.

In an embodiment, the system 120 further includes a display device 128 configured to display a human perceivable presentation of data descriptive of the acceleration, speed, distance, direction, or course traveled by the vehicle over the period of time. In an embodiment, the display device may include a visual display device or an audio display device. In an embodiment, the system includes the vehicle. In an embodiment, the system further includes a communication circuit 132 configured to output an electronic signal indicative of the acceleration, speed, distance, direction, or course traveled by the vehicle over the period of time. In an embodiment, the communication circuit is further configured to output a signal indicative of a course traveled by the vehicle over the period of time with reference to a previous known good position received from a satellite based navigation system, an internal navigation system of the vehicle, or user entered location. In an embodiment, the system further includes an illumination device 134 configured to illuminate at least a portion of the stochastic surface 190 during a capture of the first digital image or the second digital image.

Figure 3:
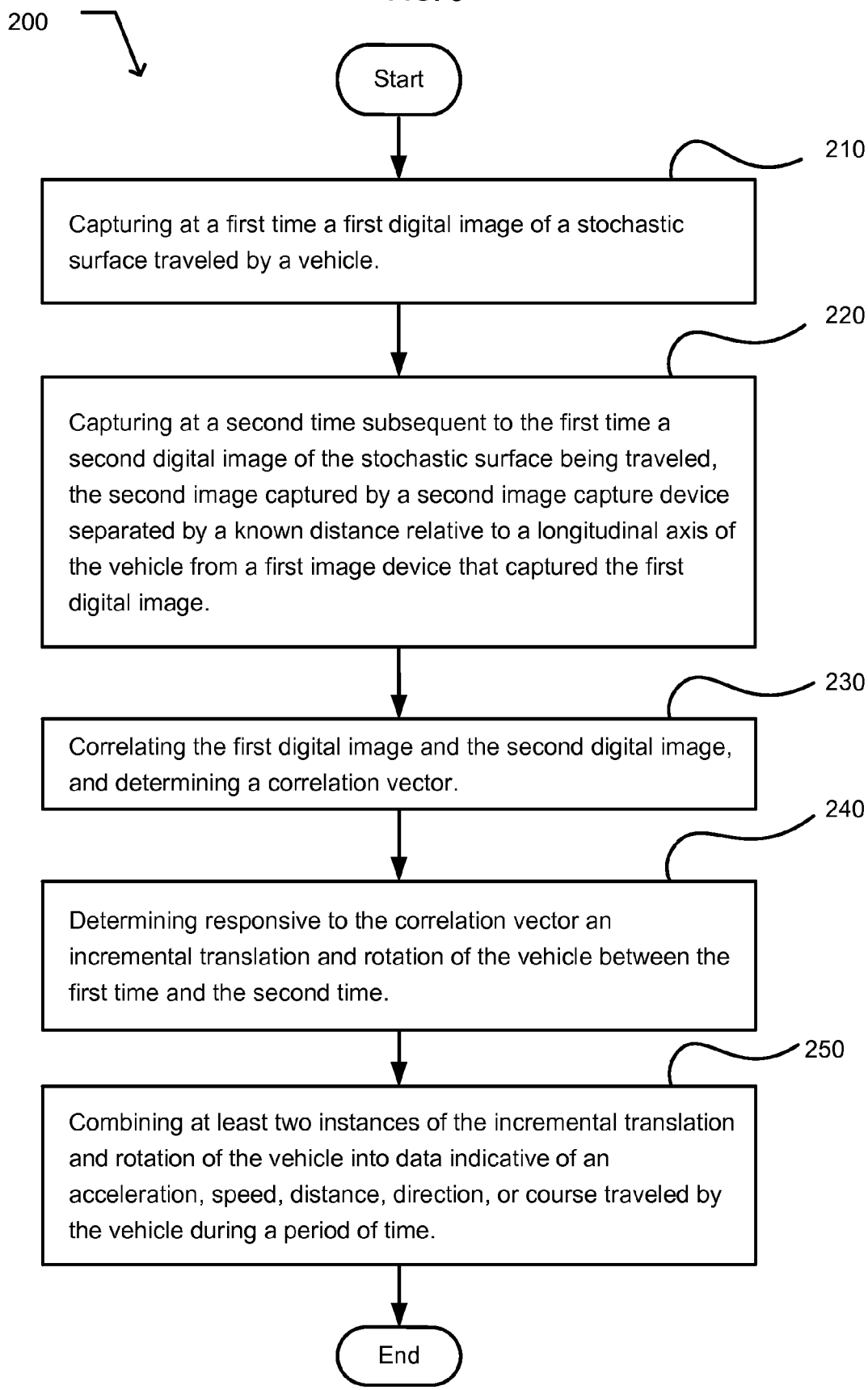
FIG. 3 illustrates an example operational flow.

FIG. 3 illustrates an example operational flow 200. After a start operation, the operational flow includes a first image acquisition operation 210. The first image acquisition operation includes capturing at a first time a first digital image of a stochastic surface being traveled by a vehicle. In an embodiment, the first image acquisition operation may be implemented by the first digital imaging device 112 carried by the vehicle 180 capturing an image of the stochastic surface 190. A second image acquisition operation 220 includes capturing at a second time subsequent to the first time a second digital image of the stochastic surface being traveled. The second image is captured by a second image capture device separated by a known distance relative to a longitudinal axis of the vehicle from a first image device that captured the first digital image. In an embodiment, the second image acquisition operation may be implemented by the second digital imaging device 114 carried by the vehicle and capturing an image of the stochastic surface at a second time subsequent to the first time described in conjunction with FIG. 2. A correlation operation 230 includes correlating the first digital image and the second digital image, and determining a correlation vector. In an embodiment, the correlation operation may be implemented by the digital image correlator circuit 122 described in conjunction with FIG. 2. In an embodiment, the correlation operation maybe implemented in the digital image correlator circuit by a feature correlation or an edge detection. A motion analysis operation 240 includes determining responsive to the correlation vector an incremental translation and rotation of the vehicle between the first time and the second time. In an embodiment, the motion analysis operation may be implemented using the kinematics circuit 124 described in conjunction with FIG. 2. A tracking operation 250 includes combining at least two instances of the incremental translation and rotation into data indicative of an acceleration, speed, distance, direction, or course traveled by the vehicle during a period of time. In an embodiment, the tracking operation may be implemented using the navigation circuit 126 described in conjunction with FIG. 2. The operational flow includes an end operation.

In an embodiment, the operational flow 120 includes transforming the data into a particular human-perceivable depiction of the acceleration, speed, distance, direction, or course traveled by the vehicle during a period of time. In an embodiment, the operational flow includes transforming the data indicative of an acceleration, speed, distance, direction, or course into data usable in displaying a particular visual depiction of the acceleration, speed, distance, direction, or course traveled by the vehicle during a period of time. In an embodiment, the operational flow includes outputting an electronic signal usable in displaying a particular visual depiction of the acceleration, speed, distance, direction, or course traveled by the vehicle during a period of time. In an embodiment, the operational flow includes outputting an electronic signal usable by a navigation system 170 carried onboard the vehicle. In an embodiment, the navigation system is configured to display vehicle navigation information responsive to data received from a satellite based global positioning system, wheel sensor data, or the electronic signal output by the operational flow 100. In an embodiment, the operational flow includes illuminating at least a portion of the stochastic surface during a capture of the first digital image or the second digital image.

Figure 4:
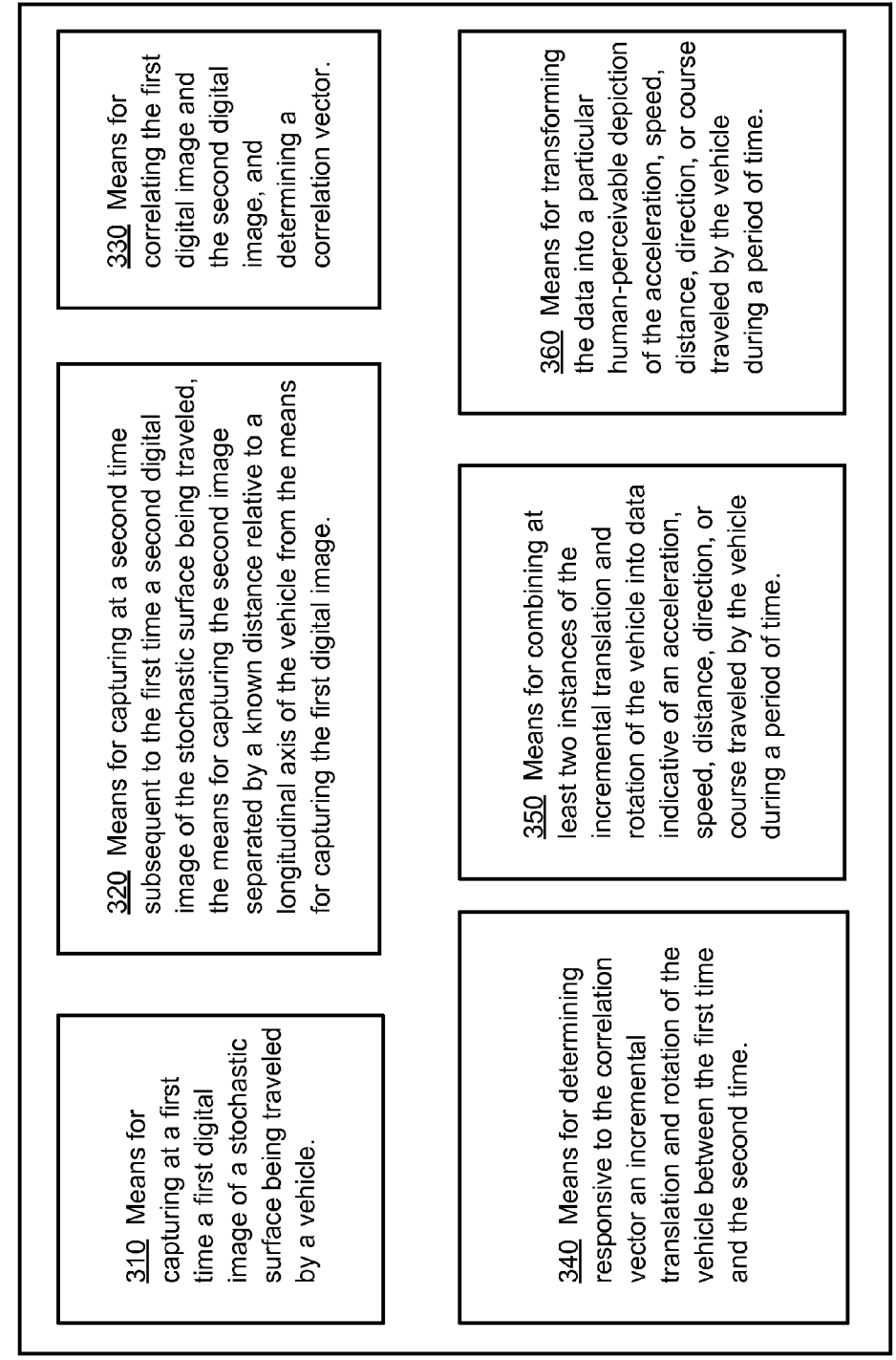
FIG. 4 illustrates a system.

FIG. 4 illustrates a system 300. The system includes means 310 for capturing at a first time a first digital image of a stochastic surface being traveled by a vehicle. The system includes means 320 for capturing at a second time subsequent to the first time a second digital image of the stochastic surface being traveled. The means for capturing the second image is separated by a known distance relative to a longitudinal axis of the vehicle from the means for capturing the first digital image. The system includes means 330 for correlating the first digital image and the second digital image, and determining a correlation vector. The system includes means 340 for determining responsive to the correlation vector an incremental translation and rotation of the vehicle between the first time and the second time. The system includes means 350 for combining at least two instances of the of the incremental translation and rotation of the vehicle into data indicative of an acceleration, speed, distance, direction, or course traveled by the vehicle during a period of time. In an embodiment, the system also includes means 360 for transforming the data into a particular human-perceivable depiction of the acceleration, speed, distance, direction, or course traveled by the vehicle during a period of time.

Figure 5:
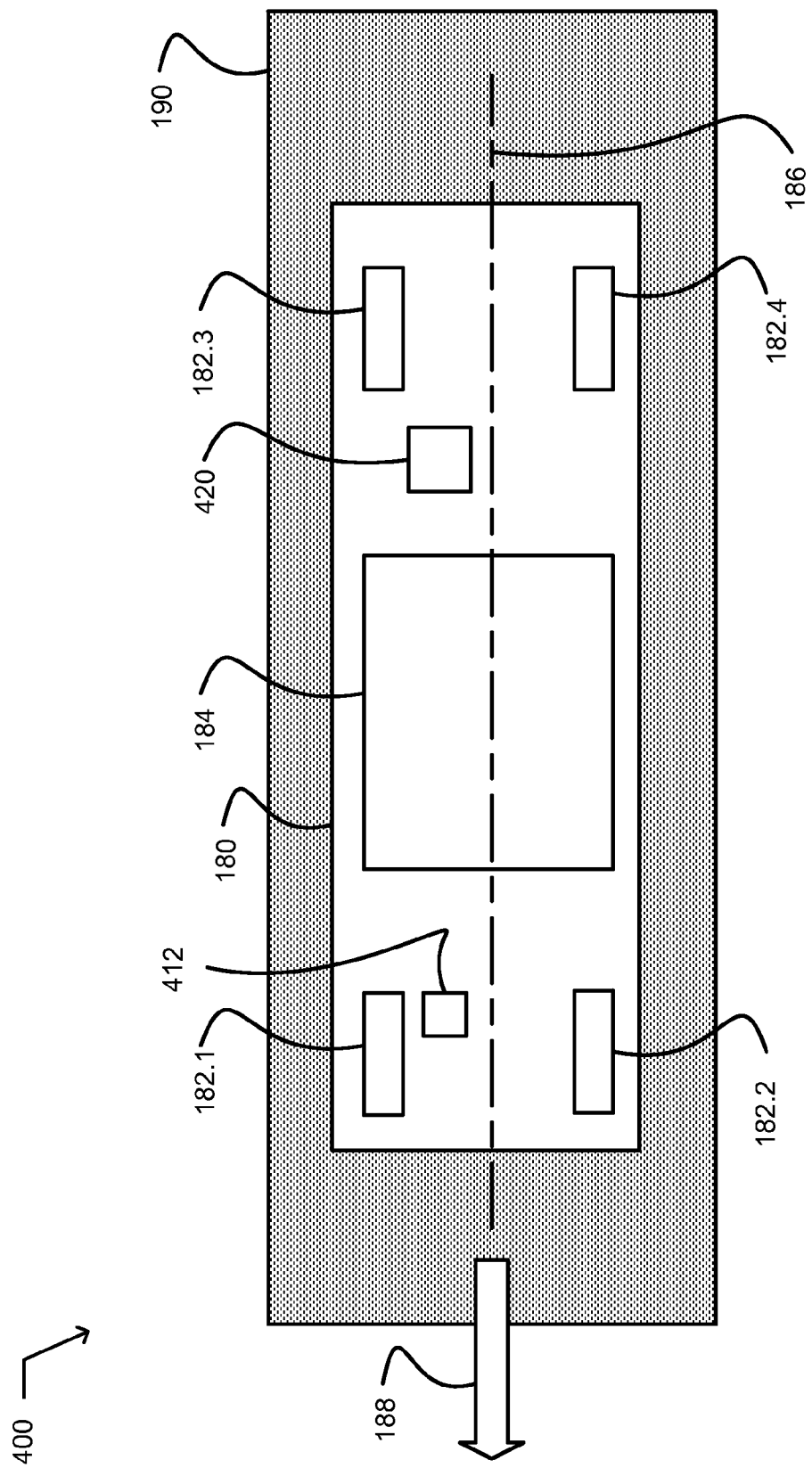
FIG. 5 illustrates an environment in which embodiments may be implemented.

FIG. 5 illustrates an environment 400 in which embodiments may be implemented. The environment includes the vehicle 180 traveling in the direction 188 across the stochastic surface 190. A system 420 includes a digital imaging device 412 configured to capture multiple pixel two-dimensional digital images. While FIG. 5 illustrates the digital imaging device positioned proximate to right front wheel 182.1, in other embodiments the digital imaging device may be positioned proximate to any of the other wheels of the vehicle.

Figure 6:
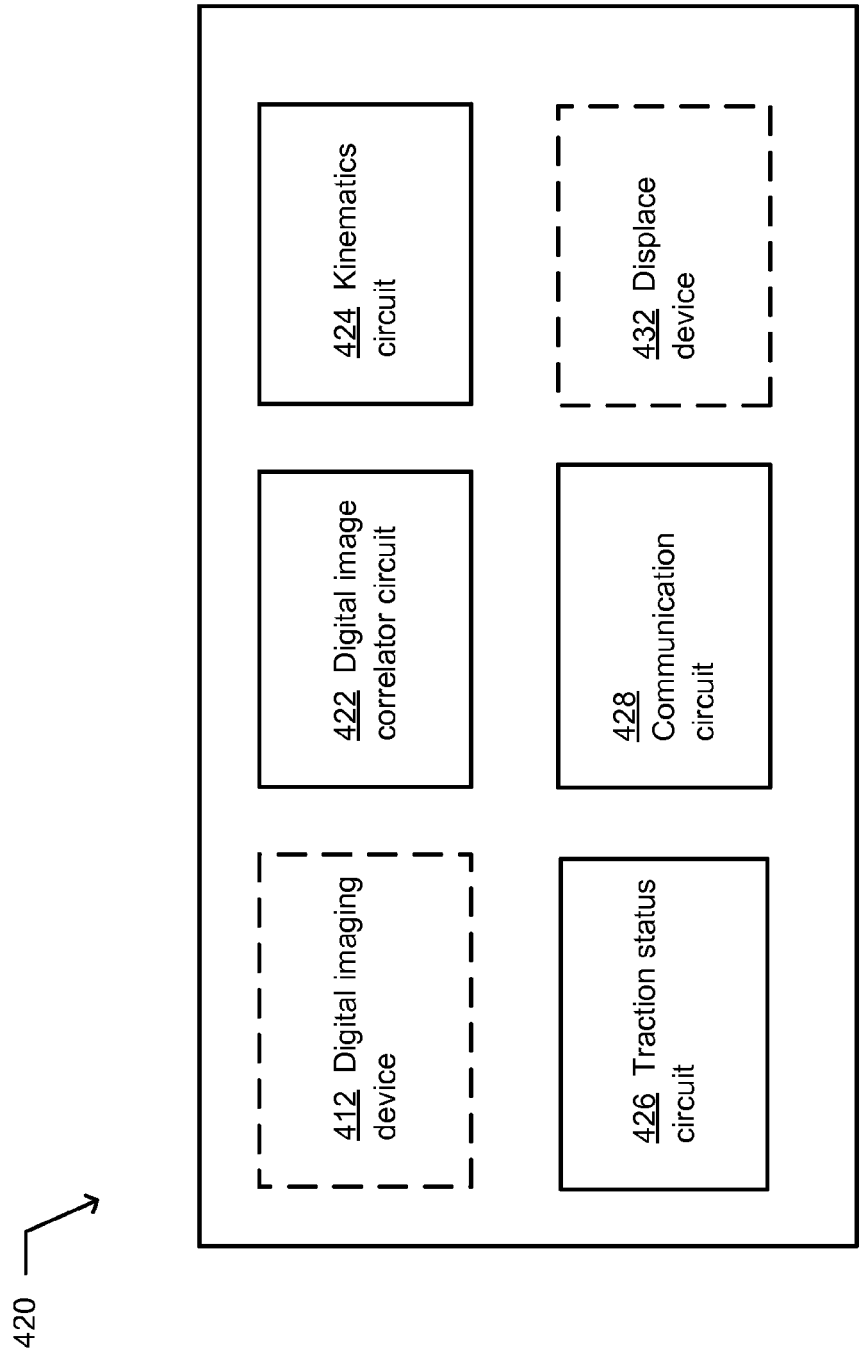
FIG. 6 illustrates additional elements of the system of FIG. 5.

FIG. 6 illustrates additional elements of the system 420 of FIG. 5. The system includes a digital image correlator circuit 422 configured to (i) correlate a first digital image having a field of view that includes a portion of the wheel 182.1 of a terrestrial vehicle 180 in contact with a stochastic surface 190 traveled by the vehicle and that also includes a portion of the stochastic surface proximate to the contact with the wheel (hereafter "contact region") captured at a first time with a second digital image of the contact region captured at a subsequent second time, and (ii) determine a correlation vector. In an embodiment, the contact region includes at least a portion of the stochastic surface and at least a portion of the wheel beyond the physical contact between the wheel and the stochastic surface. For example, a portion of the wheel may include a portion of a tread or sidewall of a tire of the wheel, or a rim of the wheel proximate to or above the stochastic surface. In an embodiment, the contact region includes a portion of the tire carried by the wheel proximate to the where the wheel and the stochastic surface are in physical contact. In an embodiment, the contact region includes a portion of the stochastic surface proximate to where the tire carried by the wheel and the stochastic surface are in physical contact. For example, in an embodiment, the wheel may include a rim and a tire mounted on the rim. In such example, the contact region would include a region of a contact between a tire mounted on a rim of the wheel 182.1 of a terrestrial vehicle and a stochastic surface traveled by the vehicle.

The system 420 includes a kinematics circuit 424 configured to determine responsive to the correlation vector an incremental slide or slip of the wheel relative to the stochastic surface. The system includes a traction status circuit 426 configure to combine at least two instances of the incremental slide or slip of the wheel into data indicative of a slide or slip by the terrestrial vehicle relative to the stochastic surface during a period of time. In an embodiment, the traction status circuit is configured to combine at least two sequential instances of the incremental slide or slip of the wheel. In an embodiment, the slide or slip is longitudinal and generally parallel to the longitudinal axis 186 of the vehicle. For example in longitudinal slide or slip, the wheel not rolling at same speed as vehicle is traveling in the direction of travel 188. In an embodiment, the slide or slip is lateral and generally orthogonal to the longitudinal axis of the vehicle. The system includes a communications circuit 428 configured to output an electronic signal indicative of the data indicative of a slide or slip by the terrestrial vehicle relative to the stochastic surface over the period of time. In an embodiment, the kinematics circuit includes a model of the vehicle dynamics. In an embodiment, the model of the vehicle dynamics may include an at least partially learned model of the vehicle dynamics. For example, kinematics circuit may include a neural network or an adaptive model, such as a Kahlman filter or the like, configured to generate the at least partially learned model. In an embodiment, the at least partially learned model is responsive to at least two previously determined correlation vectors.

In an embodiment, the traction status circuit 426 is further configured to combine at least two instances of the incremental slide or slip of the wheel into data indicative of a driving hazard level responsive to a slide or slip by the wheel 182.1 of the terrestrial vehicle 180 relative to the stochastic surface 190 during a period of time. In an embodiment, the driving hazard level includes a first hazard level indicative of a low or no driving hazard and a second hazard level indicative of a high driving hazard. In an embodiment, the communications circuit 428 is configured to output an electronic signal indicative of the data indicative of a slide or slip by the wheel relative to the stochastic surface over the period of time in a format usable by an operations controller of the vehicle 180. For example, the operations controller may include a braking, acceleration, steering, or maneuvering controller. In an embodiment, the communications circuit is configured to output an electronic signal indicative of the data indicative of a slide or slip by the wheel relative to the stochastic surface over the period of time in a format usable by a traction controller of the vehicle. In an embodiment, the wheel includes at least two discrete marks arranged circumferentially on the wheel (rim or tire) and discernible by the digital image correlator circuit. In an embodiment, the system includes the system 420 a display device configured to display a human perceivable presentation of the data indicative of a slide or slip by the vehicle relative to the stochastic surface during a period of time. In an embodiment, the display device includes a visual display device. In an embodiment, the display device includes an audio display device.

FIG. 7 illustrates an example operational flow 500. After a start operation, the operational flow includes a first image acquisition operation 510. The first image acquisition operation includes capturing at a first time a first digital image having a field of view that includes a portion of a wheel of a terrestrial vehicle in contact with a stochastic surface traveled by the vehicle and that also includes a portion of the stochastic surface proximate to the contact with the wheel (hereafter "contact region"). In an embodiment, the first image acquisition operation may be implemented using the digital imaging device 412 described in conjunction with FIGS. 5 and 6. A second image acquisition operation 520 includes capturing at a subsequent second time a second digital image of the contact region. In an embodiment, the second image acquisition operation may be implemented using the digital imaging device 412 described in conjunction with FIGS. 5 and 6. A correlation operation 530 includes correlating the first digital image with the second digital image, and determining a correlation vector. In an embodiment, the correlation operation may be implemented using the digital image correlator circuit 422 described in conjunction with FIG. 6. A motion analysis operation 540 includes determining responsive to the correlation vector an incremental slide or slip of the wheel relative to the stochastic surface. In an embodiment, the motion analysis operation may be implemented using the kinematics circuit 424 described in conjunction with FIG. 6. A traction status operation 550 includes combining at least two instances of the incremental slide or slip of the wheel into data indicative of a slide or slip by the terrestrial vehicle relative to the stochastic surface during a period of time. In an embodiment, the fraction status operation may be implemented using the traction status circuit 426 described in conjunction with FIG. 6. A communication operation 560 includes outputting an electronic signal indicative of the data indicative of a slide or slip by the terrestrial vehicle relative to the stochastic surface over the period of time. In an embodiment, the communication operation may be implemented using the communication circuit 428 described in conjunction with FIG. 6. The operational flow includes an end operation.

In an embodiment, the traction status operation 550 further includes combining at least two instances of the incremental slide or slip of the wheel into data indicative of a driving hazard level responsive to a slide or slip by the wheel of the terrestrial vehicle relative to the stochastic surface during a period of time. In an embodiment, the operational flow 500 includes transforming the data into a particular human-perceivable depiction of the slide or slip by the wheel relative to the stochastic surface over the period of time. In an embodiment, the human-perceivable depiction may be displayed using the display device 432 described in conjunction with FIG. 6. In an embodiment, the operational flow 500 includes illuminating at least a portion of the stochastic surface during a capture of digital image.

FIG. 8 illustrates an example system 600. The system includes means 610 for capturing (i) at a first time a first digital image having a field of view that includes a portion of a wheel of a terrestrial vehicle in contact with a stochastic surface traveled by the vehicle and that also includes a portion of the stochastic surface proximate to the contact with the wheel (hereafter "contact region"), and (ii) at a subsequent second time a second digital image of the contact region. The system includes means 620 for correlating the first digital image with the second digital image and determining a correlation vector. The system includes means 630 for determining responsive to the correlation vector an incremental slide or slip of the wheel relative to the stochastic surface. The system includes means 640 for combining at least two instances of an incremental slide or slip by the wheel into data indicative of a slide or slip by the terrestrial vehicle relative to the stochastic surface during a period of time. The system includes means 650 for outputting an electronic signal indicative of the data indicative of a slide or slip by the terrestrial vehicle relative to the stochastic surface over the period of time.

In an embodiment, the means 640 for combining further includes means for combining at least two instances of the incremental slide or slip of the wheel into data indicative of a driving hazard level responsive to a slide or slip by the wheel of the terrestrial vehicle relative to the stochastic surface during a period of time. In an embodiment, the system includes means 660 for transforming the data into a particular human-perceivable depiction of the slide or slip by the terrestrial vehicle relative to the stochastic surface over the period of time.

All references cited herein are hereby incorporated by reference in their entirety or to the extent their subject matter is not otherwise inconsistent herewith.

In some embodiments, "configured" includes at least one of designed, set up, shaped, implemented, constructed, or adapted for at least one of a particular purpose, application, or function.

It will be understood that, in general, terms used herein, and especially in the appended claims, are generally intended as "open" terms. For example, the term "including" should be interpreted as "including but not limited to." For example, the term "having" should be interpreted as "having at least." For example, the term "has" should be interpreted as "having at least." For example, the term "includes" should be interpreted as "includes but is not limited to," etc. It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "at least two chambers," or "a plurality of chambers," without other modifiers, typically means at least two chambers).

In those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated"

such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable or physically interacting components or wirelessly interactable or wirelessly interacting components.

With respect to the appended claims the recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Use of "Start," "End," "Stop," or the like blocks in the block diagrams is not intended to indicate a limitation on the beginning or end of any operations or functions in the diagram. Such flowcharts or diagrams may be incorporated into other flowcharts or diagrams where additional functions are performed before or after the functions shown in the diagrams of this application. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
   a first digital imaging device and a second digital imaging device, each digital imaging device configured to capture multiple pixel two-dimensional digital images of a stochastic surface traveled by a vehicle, the first digital imaging device and the second digital imaging device coupled to the vehicle;
   a digital image correlator configured to (i) correlate a first digital image of the stochastic surface captured by the first digital imaging device at a first time and a second digital image of the stochastic surface captured by the second digital imaging device at a subsequent second time, and (ii) determine a correlation vector, wherein the first digital image acquired by the first digital imaging device and the second digital image acquired by the second imaging device;
   a kinematics circuit configured to determine in response to the correlation vector an incremental translation and rotation of the vehicle between the first time and the second time; and
   a navigation circuit configured to combine at least two instances of the incremental translation and rotation of the vehicle into data indicative of an acceleration, speed, distance, direction, or course traveled by the vehicle during a period of time.

2. The system of claim 1, wherein the stochastic surface includes a road surface.

3. The system of claim 1, wherein the stochastic surface includes a surface of a train or railroad roadbed.

4. The system of claim 1, wherein the stochastic surface includes a surface of an underground vehicle or train roadbed.

5. The system of claim 1, wherein the first digital imaging device includes a first high resolution digital imaging device and the second digital imaging device includes a second relatively lower resolution imaging device.

6. The system of claim 1, wherein at least one of the digital imaging devices has a resolution greater than 100 pixels by 100 pixels.

7. The system of claim 1, wherein at least one of the digital imaging devices is configured to capture visible light digital images of the stochastic surface.

8. The system of claim 1, wherein at least one of the digital imaging devices is configured to capture infrared light or ultraviolet light digital images of the stochastic surface.

9. The system of claim 1, wherein at least one of the digital imaging devices is configured to capture ultrasound images of the stochastic surface.

10. The system of claim 1, wherein at least one of the digital imaging devices is configured to capture sonar digital images of the stochastic surface.

11. The system of claim 1, wherein at least one of the digital imaging devices is configured to capture color, spectral, multispectral, or hyperspectral digital images of the stochastic surface.

12. The system of claim 1, wherein at least one of the digital imaging devices is configured to capture millimeter-wave or terahertz wave digital images of the stochastic surface.

13. The system of claim 1, wherein the second imaging device is separated a known distance from the first imaging device.

14. The system of claim 13, wherein the second imaging device is separated a known distance from the first imaging device relative to a longitudinal axis of the vehicle.

15. The system of claim 1, wherein the digital image correlator is configured to account for a z-axis motion or a tilt of the vehicle relative to the stochastic surface.

16. The system of claim 1, wherein the digital image correlator is configured to correlate the first image and the second image using an image array processing system.

17. The system of claim 1, wherein the digital image correlator is configured to correlate the first image and the second image using a feature correlation or an edge detection methodology.

18. The system of claim 1, wherein the first digital imaging device is carried by the vehicle on a forward portion of the vehicle and the second digital imaging device is carried by the vehicle on a rearward portion of the vehicle.

19. The system of claim 1, wherein the first digital imaging device is carried by the vehicle in a portion of a forward one-third of the vehicle and the second digital imaging device is carried by the vehicle in a portion of a rearward one-third of the vehicle as measured along the longitudinal axis of the vehicle.

20. The system of claim 1, wherein the known separation distance is at least five feet.

21. The system of claim 1, wherein the determined correlation vector is responsive to the known separation distance.

22. The system of claim 1, wherein the kinematics circuit is configured to determine responsive to the correlation and the known separation distance a correlation vector indicative of an incremental translation and rotation of the vehicle between the first time and the second time.

23. The system of claim 1, wherein the kinematics circuit is further configured to determine an incremental slip or skid of a wheel of the vehicle in response to the correlation vector and in response to data received from a wheel speed sensor.

24. The system of claim 1, further comprising:
a display device configured to display a human perceivable presentation of the data descriptive of the acceleration, speed, distance, direction, or course traveled by the vehicle over the period of time.

25. The system of claim 1, further comprising:
the vehicle.

26. The system of claim 1, further comprising:
a communication circuit configured to output an electronic signal indicative of the acceleration, speed, distance, direction, or course traveled by the vehicle over the period of time.

27. The system of claim 26, wherein the communication circuit is further configured to output a signal indicative of a course traveled by the vehicle over the period of time with reference to a previous known good position received from a satellite based navigation system, an internal navigation system of the vehicle, or user entered location.

28. The system of claim 26, wherein the communication circuit is further configured to output the electronic signal to an onboard navigation system of the vehicle.

29. The system of claim 28, wherein the onboard navigation system is configured to display vehicle navigation information responsive to data received from a satellite based global positioning system, wheel sensor data, or the electronic signal.

30. The system of claim 1, further comprising:
an illumination device configured to illuminate at least a portion of the stochastic surface during a capture of the first digital image or the second digital image.

31. A method comprising:
capturing at a first time a first digital image of a stochastic surface being traveled by a vehicle;
capturing at a second time subsequent to the first time a second digital image of the stochastic surface being traveled;
correlating the first digital image and the second digital image, and determining a correlation vector;
determining responsive to the correlation vector an incremental translation and rotation of the vehicle between the first time and the second time; and
combining at least two instances of the incremental translation and rotation of the vehicle into data indicative of an acceleration, speed, distance, direction, or course traveled by the vehicle during a period of time.

32. The method of claim 31, wherein the second image is captured by a second image capture device separated by a known distance from a first image device that captured the first digital image.

33. The method of claim 32, wherein the second image capture device is separated by a known distance relative to a longitudinal axis of the vehicle from the first image device.

34. The method of claim 31, further comprising:
transforming the data into a particular human-perceivable depiction of the acceleration, speed, distance, direction, or course traveled by the vehicle during a period of time.

35. The method of claim 31, further comprising:
transforming the data indicative of an acceleration, speed, distance, direction, or course into data usable in displaying a particular visual depiction of the acceleration, speed, distance, direction, or course traveled by the vehicle during a period of time.

36. The method of claim 31, further comprising:
outputting an electronic signal usable in displaying a particular visual depiction of the acceleration, speed, distance, direction, or course traveled by the vehicle during a period of time.

37. The method of claim 31, further comprising:
illuminating at least a portion of the stochastic surface during a capture of the first digital image or the second digital image.

38. a system comprising:
means for capturing at a first time a first digital image of a stochastic surface being traveled by a vehicle;
means for capturing at a second time subsequent to the first time a second digital image of the stochastic surface being traveled;
means for correlating the first digital image and the second digital image, and determining a correlation vector
means for determining responsive to the correlation vector an incremental translation and rotation of the vehicle between the first time and the second time; and
means for combining at least two instances of the incremental translation and rotation of the vehicle into data indicative of an acceleration, speed, distance, direction, or course traveled by the vehicle during a period of time.

39. The system of claim 38, wherein the means for capturing the second image is separated by a known distance from the means for capturing the first digital image.

40. The system of claim 39, wherein the means for capturing the second image is separated by a known distance relative to a longitudinal axis of the vehicle from the means for capturing the first digital image.

41. The system of claim 38, further comprising:
means for transforming the data into a particular human-perceivable depiction of the acceleration, speed, distance, direction, or course traveled by the vehicle during a period of time.

* * * * *